3,390,159
PROCESS FOR PREPARING
DIOCTYLTIN OXIDE

Tatsuo Katsumura and Hirohisa Kataoka, Suita-shi, and Yutaka Mizuno, Osaka-shi, Japan, assignors to Nitto Chemical Industrial Co., Ltd., Osaka, Japan, a corporation of Japan
No Drawing. Filed Sept. 16, 1964, Ser. No. 397,013
Claims priority, application Japan, Sept. 19, 1963, 38/49,422
12 Claims. (Cl. 260—429.7)

ABSTRACT OF THE DISCLOSURE

In accordance with certain of its aspects, the novel process of this invention for producing di-n-octyltin oxide may comprise hydrolyzing di-n-octyltin dihalide with aqueous alkali in the presence of a hydrocarbon solvent thereby forming di-n-octyltin oxide in a reaction mixture; maintaining the temperature of said reaction mixture at 60° C.–100° C. during said hydrolysis; and recovering said di-n-octyltin oxide from said reaction mixture.

---

This invention relates to a process for manufacturing high purity di-n-octyltin oxide from di-n-octyltin dihalide.

n-Octyltin compounds are valued for their use as stabilizers for polyvinyl chloride, since their toxicity is remarkably low, compared with that of conventionally available butyltin compounds. However, the employment of these compounds is rather restricted from the viewpoint of cost. Hence, there has been a strong desire for development of a new process for their manufacture.

Di-n-octyltin oxide, an intermediate necessary for producing n-octyltin stabilizers, is obtained by hydrolysis of di-n-octyltin dihalide. It is very difficult, however, to produce high purity di-n-octyltin oxide from commercial di-n-octyltin dihalide industrially by simple operations and economically at low cost. This is because commercial, relatively impure di-n-octyltin dihalide is produced by disproportionation reaction of stannic halide with tetra-n-octyltin, which is prepared by the Grignard or the Wurtz reaction and also by the direct reaction of tin metal and n-octyl halide.

In both reactions however tetra-n-octyltin, tri-n-octyltin halide, n-octyltin trihalide, and inorganic tin compounds are produced as by-products and hence, di-n-octyltin dihalide is obtained as an impure mixture containing these by-products.

Although di-n-octyltin oxide is obtained as solid precipitate by direct hydrolysis of the dihalide with aqueous alkali or by hydrolysis of the solution of dihalide dissolved in a water-soluble organic solvent, its purity is rather low since the by-products, alkali and alkali halide, are included in the products in these processes. In this case, water-soluble impurities can be removed by repeating the wash of the product with water. But the operation is difficult because of their water-repellent character. Besides, water-insoluble impurities cannot be removed. Therefore, the stabilizer produced from di-n-octyltin oxide obtained in these processes is not only deficient with respect to its stabilizing activities but it does not possess the desirably low toxicity. Consequently, in the production of di-n-octyltin oxide by conventional hydrolysis reaction, it has been necessary to employ dihalide which has been purified by distillation, recrystallization, and other processes, just as is the case in the preparation of other dialkyl tin oxides.

However, di-n-octyltin dihalide has a high boiling point (B.P. 164–165° C./0.16 mm. Hg, J. Appl. Chem., 7, 369 (1957)) and easily decomposes; hence its purification by distillation must be done under a high vacuum which necessitates expensive plant(s) and equipment characterized by limited output. Besides, as di-n-octyltin dichloride is very easily dissolved in ordinary organic solvents, the purification by recrystallization makes its yield very low. Because of these and other difficulties in operation, di-n-octyltin dihalide cannot be economically purified on an industrial scale. As long as the conventional hydrolysis is employed, the purification of di-n-octyltin dihalide is indispensable so that the product di-n-octyltin oxide becomes very expensive.

In accordance with certain of its aspects, the novel process of this invention for producing di-n-octyltin oxide may comprise hydrolyzing di-n-octyltin dihalide with aqueous alkali in the presence of a hydrocarbon solvent thereby forming di-n-octyltin oxide in a reaction mixture; maintaining the temperature of said reaction mixture at 60° C.–100° C. during said hydrolysis; and recovering said di-n-octyltin oxide from said reaction mixture.

In accordance with certain of its more specific aspects, the novel process of this invention for producing di-n-octyltin oxide may comprise hydrolyzing di-n-octyltin dihalide with aqueous alkali in the presence of a hydrocarbon solvent thereby forming di-n-otyltin oxide in a reaction mixture; maintaining the temperature of the reaction mixture at 60° C.–100° C. during said hydrolysis whereby said di-n-octyltin oxide dissolves in said hydrocarbon solvent; cooling said hydrocarbon solvent to ambient temperature, typically 15° C.–20° C., thereby precipitating therefrom said di-n-octyltin oxide; and recovering said di-n-octyltin oxide from said reaction mixture.

The di-n-octyltin dihalide which may be treated by practice of this invention may typically include di-n-octyltin dibromide, di-n-octyltin diiodide, and preferably di-n-octyltin dichloride. It is a particular feature of this invention that crude or impure di-n-octyltin dihalide such as that containing tetra-n-octyltin, tri-n-octyltin halide, tri-n-octyltin compounds, may be used as charge material to this process.

The solvent to be used in the process of this invention is preferably selected from hydrocarbons, such as benzene, toluene, xylene, cyclohexane, and ligroin. Said solvent may be employed in the amount of at least 4 times, ordinarily 6–7 times by weight of the di-n-octyltin dihalide. However, the ratio may be varied according to the purity of dihalide, although there is no need to employ said solvent in a very large amount.

The reaction may be carried out by treating the hydrocarbon solution of di-n-octyltin dihalide with aqueous alkali. The preferred aqueous alkali which may be employed may be caustic soda, i.e., sodium hydroxide. The reaction mixture may be maintained at typically less than about 60° C.–100° C. at which temperature hydrolysis may be completed. Prior to heating to 60° C.–100° C., the reaction mixture may, if desired, be maintained at temperature less than 60° C. and typically at 15° C.–25° C. or 40° C.–50° C.

According to the present invention, crude or impure di-n-octyltin dihalide can be hydrolyzed directly to obtain pure di-n-octyltin oxide, since di-n-octyltin oxide produced exists in a solution of hydrocarbon and can be easily washed with hot water. At the same time, water-insoluble impurities and colored materials remaining dissolved in the hydrocarbon are removed from the oxide on cooling. Furthermore, di-n-octyltin oxide may readily be precipitated from the hydrocarbon solvent by cooling and can then be dried in a short time. Thus, according to the present invention, high purity di-n-octyltin oxide is produced conveniently, quickly, and economically. Besides, by directly separating the solvent from reaction mixture, tetra-n-octyltin and bis(tri-n-octyltin)-oxide can easily be recovered as residues. Separating may be by evaporating or distilling.

EXAMPLE 1

To 41.6 kg. of crude or impure di-n-octyltin dichloride (purity 90.2%), which may be prepared by the disproportionation reaction of stannic chloride with crude or impure tetra-n-octyltin (which may be obtained by the Grignard reaction), 50 kg. of toluene may be added. After filtering, this solution may be added into the mixture of 9.2 kg. of caustic soda, 37 kg. of water, and 220 kg. of toluene at 20° C.–30° C. and then stirred for 30 minutes at 70° C.–80° C. After separation of the lower aqueous layer, the toluene solution may be added to 80 kg. of water to wash with stirring at 70° C.–80° C. After repeating the wash in the same manner, the toluene layer may be cooled at 15° C.–20° C. and precipitated di-n-octyltin oxide centrifuged and dried. 32.2 kg. (98.9% by weight of theoretical) of colorless di-n-octyltin oxide may be obtained. The analysis of this product gave a value of 32.65% for Sn (32.87% theoretical). From the mother liquor, i.e., toluene layer, 263 kg. of toluene was recovered in 97.3% by weight of theoretical yield.

Di-n-octylin dichloride, which may be obtained in the yield of 99.5% by weight by treating this product with concentrated hydrochloric acid, gave a melting point of 48° C.–49° C. (literature value 47.5° C.–48.5° C.). This indicates that said oxide was obtained in high purity.

EXAMPLE 2

To 60 g. of impure (purity 77.6%) di-n-octyltin diiodide (which may be prepared by direct reaction of metal tin and n-octyl iodide) 90 g. of cyclohexane may be added. This solution may be added into the mixture of 9.2 g. of caustic soda, 37 g. of water, and 330 g. of cyclohexane at 40° C.–50° C., and then stirred for 30 minutes at 70° C.–80° C. After separation of the aqueous layer, the cyclohexane may be added to water to wash at 70° C.–80° C. After repeating the wash in the same manner, the cyclohexane may be cooled at 15° C.–20° C. and the precipitated di-n-octyltin oxide may be filtered and dried. 27.6 g. (98.4% by weight of theoretical) of this product may be obtained, analyzing 32.52% Sn.

EXAMPLE 3

Di-n-octyltin dichloride (which may be prepared by disproportionation reaction of stannic chloride with crude tetra-n-octyltin which may be obtained by the Wurtz's reaction) may be purified by distillation under reduced pressure and recrystallization. 82.2 g. of this compound may be dissolved in 80 g. of xylene and the solution may be added to a mixture of 8.8 g. of caustic soda, 35 g. of water, and 290 g. of xylene at 90°–100° C. and then stirred for 30 minutes. After completion of the reaction, the operations as described in Example 2 may be carried out to obtain di-n-octyltin oxide in the amount of 72.2 g. (99.6% by weight of theoretical) analyzing 32.81% Sn.

EXAMPLE 4

50.5 g. of crude (purity 39.7%) di-n-octyltin dibromide (which may be prepared by direct reaction of metal tin and n-octyl bromide) may be dissolved in 100 g. of ligroin. This solution may be added to a mixture of 11.2 g. of caustic soda, 45 g. of water, and 300 g. of ligroin at 15° C.–25° C. and then stirred for 30 minutes at 70° C.–80° C. After completion of the reaction, the operations as described in Example 2 may be carried out to obtain di-n-octyltin oxide in the amount of 14 g. (97.9% by weight of theoretical) and analyzing Sn. 32.70%. The same result may be obtained employing benzene instead of ligroin.

Although this invention has been illustrated by reference to specific examples, numerous changes and modifications thereof which clearly fall within the scope of the invention will be apparent to those skilled in the art.

We claim:

1. The process for producing di-n-octyltin oxide which comprises hydrolyzing di-n-octyltin dihalide with aqueous alkali in the presence of a hydrocarbon solvent thereby forming di-n-octyltin oxide in a reaction mixture; maintaining the temperature of said reaction mixture at 60° C.–100° C. during said hydrolysis; and recovering said di-n-octyltin oxide from said reaction mixture.

2. The process of claim 1 wherein said hydrocarbon solvent is present in amount of at least 4 times the amount by weight of di-n-octyltin dihalide.

3. The process of claim 1 wherein said di-n-octyltin dihalide is present as impure di-n-octyltin dihalide.

4. The process of claim 1 wherein said reaction mixture is maintained at temperature of 15° C.–25° C. prior to maintaining the temperature at 60° C.–100° C.

5. The process of claim 1 wherein said hydrocarbon solvent is selected from the group consisting of benzene, toluene, xylene, cyclohexane, and ligroin.

6. The process of claim 1 wherein said hydrocarbon solvent is toluene.

7. The process of claim 1 wherein said hydrocarbon solvent is xylene.

8. The process of claim 1 wherein said hydrocarbon solvent is cyclohexane.

9. The process of claim 1 wherein said hydrocarbon solvent is ligroin.

10. The process for producing di-n-octyltin oxide which comprises hydrolyzing di-n-octyltin dihalide with aqueous alkali in the presence of a hydrocarbon solvent thereby forming di-n-octyltin oxide in a reaction mixture; maintaining the temperature of said reaction mixture at 60° C.–100° C. during said hydrolysis whereby said di-n-octyltin oxide dissolves in said hydrocarbon solvent; cooling said hydrocarbon solvent to ambient temperature thereby precipitating therefrom said di-n-octyltin oxide; and recovering said di-n-octyltin oxide from said reaction mixture.

11. The process for producing di-n-octyltin oxide as claimed in claim 10 wherein said hydrocarbon solvent is cooled to 15° C.–20° C. thereby precipitating therefrom said di-n-octyltin oxide.

12. The process for producing di-n-octyltin oxide which comprises hydrolyzing di-n-octyltin dihalide with aqueous alkali in the presence of a hydrocarbon solvent thereby forming di-n-octyltin oxide in a reaction mixture; maintaining the temperature of said reaction mixture at 60° C.–100° C. during said hydrolysis whereby said di-n-octyltin oxide dissolves in said hydrocarbon solvent; separating said hydrocarbon solvent from said reaction mixture; cooling said hydrocarbon solvent to ambient temperature thereby precipitating therefrom said di-n-octyltin oxide; and recovering said di-n-octyltin oxide from said reaction mixture.

References Cited

UNITED STATES PATENTS

| | | | |
|---|---|---|---|
| 2,867,642 | 1/1959 | Ramsden et al. | 260—429.7 |
| 2,892,856 | 6/1959 | Ramsden et al. | 260—429.7 |
| 3,082,230 | 3/1963 | Dorfelt et al. | 260—429.7 |

OTHER REFERENCES

Yale, Chemical Abstracts, vol. 52 (1958), pp. 291 to 292, QDI A51.

TOBIAS E. LEVOW, *Primary Examiner.*

W. F. W. BELLAMY, *Assistant Examiner.*